(12) United States Patent
Mellor et al.

(10) Patent No.: US 10,590,553 B2
(45) Date of Patent: Mar. 17, 2020

(54) METHOD OF PRODUCING METALLIC TANTALUM

(71) Applicant: METALYSIS LIMITED, Rotherham (GB)

(72) Inventors: Ian Mellor, Sheffield (GB); Greg Doughty, Rotherham (GB)

(73) Assignee: METALYSIS LIMITED, Rotherham (GB)

( * ) Notice: Subject to any disclaimer, the term of this patent is extended or adjusted under 35 U.S.C. 154(b) by 206 days.

(21) Appl. No.: 15/321,489

(22) PCT Filed: Jun. 25, 2015

(86) PCT No.: PCT/GB2015/051852
§ 371 (c)(1),
(2) Date: Dec. 22, 2016

(87) PCT Pub. No.: WO2015/198053
PCT Pub. Date: Dec. 30, 2015

(65) Prior Publication Data
US 2017/0152606 A1 Jun. 1, 2017

(30) Foreign Application Priority Data
Jun. 26, 2014 (GB) .................... 1411430.0

(51) Int. Cl.
*C25C 3/26* (2006.01)
*C22B 34/24* (2006.01)
*H01G 9/00* (2006.01)
*H01G 9/008* (2006.01)
(Continued)

(52) U.S. Cl.
CPC ............. *C25C 3/26* (2013.01); *C22B 34/24* (2013.01); *H01G 9/008* (2013.01);
(Continued)

(58) Field of Classification Search
CPC ...... H01G 9/0029; H01G 9/008; H01G 9/042; H01G 9/04; H01G 9/045; H01G 9/0525; C25C 3/26; C22B 34/24
See application file for complete search history.

(56) References Cited

U.S. PATENT DOCUMENTS 1,535,458 A 4/1925 Frary
3,188,282 A 6/1965 Freedman
(Continued)

FOREIGN PATENT DOCUMENTS

GB 860335 2/1961
WO WO 2013/028126 2/2013
WO WO 2014/102223 7/2014

*Primary Examiner* — Ciel P Thomas
(74) *Attorney, Agent, or Firm* — Saliwanchik, Lloyd & Eisenschenk (57) ABSTRACT

A method of producing metallic tantalum comprises the steps of providing a precursor comprising a tantalate of a first metal, arranging the precursor material in contact with a molten salt in an electrolytic cell, the electrolysis cell further comprising an anode and a cathode arranged in contact with the molten salt, and applying a potential between the anode and the cathode such that the precursor material is reduced to tantalum. The first metal is an alkali metal or an alkaline earth metal. The anode does not comprise a carbon material, which prevents contamination of the tantalum and improves current efficiency of the process.

31 Claims, 3 Drawing Sheets

(51) Int. Cl.
*H01G 9/042* (2006.01)
*H01G 9/04* (2006.01)
*H01G 9/052* (2006.01)
*H01G 9/045* (2006.01)

(52) U.S. Cl.
CPC ........... *H01G 9/0029* (2013.01); *H01G 9/042* (2013.01); *H01G 9/04* (2013.01); *H01G 9/045* (2013.01); *H01G 9/0525* (2013.01)

(56) References Cited

U.S. PATENT DOCUMENTS

| | | | |
|---|---|---|---|
| 5,145,713 A * | 9/1992 | Venkatesan | C23C 14/088 427/561 |
| 5,635,146 A * | 6/1997 | Singh | C01G 35/00 423/594.17 |
| 5,754,392 A | 5/1998 | Cava | |
| 2002/0139667 A1 * | 10/2002 | Wang | C22C 14/00 204/298.13 |
| 2005/0109162 A1 * | 5/2005 | Griffin | C21B 15/00 75/724 |
| 2005/0121333 A1 | 6/2005 | Strezov | |
| 2006/0065073 A1 | 3/2006 | Shekhter et al. | |
| 2007/0295609 A1 * | 12/2007 | Jeong | B22F 9/20 205/371 |
| 2010/0276297 A1 * | 11/2010 | Powell, IV | C25B 1/006 205/350 |
| 2012/0156492 A1 * | 6/2012 | Dudley | C22B 34/1263 428/402 |
| 2013/0186769 A1 * | 7/2013 | Powell | C25C 1/00 205/343 |
| 2014/0166502 A1 | 6/2014 | Teng et al. | |

* cited by examiner

METHOD OF PRODUCING METALLIC TANTALUM

CROSS-REFERENCE TO RELATED APPLICATION

This application is the National Stage of International Application Number PCT/GB2015/051852, filed Jun. 25, 2015, which is hereby incorporated by reference herein in its entirety, including any figures, tables, nucleic acid sequences, amino acid sequences, or drawings.

The invention relates to a method of producing metallic tantalum, particularly powdered tantalum, by reduction of a precursor material in an electrolytic cell.

BACKGROUND TO THE INVENTION

Tantalum is a rare transition metal having a density of 16.6 g/cm$^3$ and a melting point of 3017° C. Tantalum is hard, highly corrosion resistant, and is widely used as an alloying material, for example in making high strength alloyed steels or super alloys or carbide reinforced tools. The excellent corrosion resistance of tantalum means it is useful for making chemical process equipment and medical equipment and implants. The highest volume use of tantalum, however, is in the manufacture of capacitors. Tantalum capacitors tend to be small sized and of high capacitance, and have become vital components in cellular phones and personal computers.

The standard preparation route for tantalum powder is by reducing potassium tantalum fluoride ($K_2TaF_7$) with sodium and then water washing and acid leaching the product to remove the process salts. The powder is then dried and is known at this stage as primary or raw tantalum powder. Over the years there have been many variations on this basic process aimed at improving the process conditions and costs, and the powder's surface area. This route usually produces powders with average primary particle size ranging from 0.2 to 3.0 μm and surface areas of the order 1 to 3 m$^2$/g. At this stage the oxygen content of the powder can be in excess of 3000 to 7000 ppm. In order further to reduce impurity content (by the removal of volatile elements) and improve the handling and sintering characteristics of the powder, the raw tantalum powder is subjected to vacuum heat treatment at temperatures up to 1200° C. This process thermally agglomerates the fine powder, and to reduce its particle size the resulting agglomerate must then be sieved. This produces a granulated material with an average particle size in the region of 10-100 μm. The steps of vacuum heat treatment and thermal agglomeration are necessary to reduce the impurity content and improve the handling and sintering characteristics of the Ta powder but have the significant disadvantage that the oxygen content is increased considerably; levels as high as 12000 ppm may be reached.

The aggregated tantalum powder must therefore undergo further processing in order to reduce the oxygen levels. Typically the powders are subjected to deoxidation with magnesium metal followed by acid leaching to remove the oxidation products (i.e. MgO) and further drying and classification stages. Powders produced by the standard potassium tantalum fluoride method (described above), which are thermally-aggregated and deoxidized, usually have a BET (Brunauer-Emmett-Teller) specific surface area of approximately 1 m$^2$/g, mean primary particle size on the basis of specific surface area of around 400 nm, and a specific capacitance of approximately 50,000 CV/g. Such powders are produced in large amounts despite the complexity and cost of the fabrication procedure.

As the free energy change on reduction of tantalum oxide with active metals such as calcium, magnesium or aluminium is favourable, many attempts have been made to invent alternative process to the standard $K_2TaF_7$ process, which remove some of the well-known drawbacks mentioned above. The most successful to date is the reduction of tantalum oxide by reaction with gaseous magnesium. However, such methods are still disadvantageously complex multi-step processes wherein there is a first substantial reduction step followed by one or more deoxidation steps using similar reagents (gaseous magnesium) to achieve the desired oxygen levels.

Consequently, there is a long-felt need for a simpler process for producing tantalum, preferably a process capable of producing capacitor-grade (low oxygen content and high surface area) tantalum or Ta alloys.

Recently, it has proved possible to produce tantalum by direct reduction of a tantalum oxide feedstock. One such reduction process capable of producing tantalum is the Cambridge FFC electro-decomposition process (as described in WO 99/64638). In this method a solid tantalum oxide compound is arranged in contact with a cathode in an electrolytic cell comprising a fused salt. A potential is applied between the cathode and an anode of the cell such that tantalum oxide is reduced. In the FFC process the potential that reduces the tantalum oxide is lower than a deposition potential for a cation from the fused salt. For example, if the fused salt is calcium chloride then the cathode potential at which the tantalum oxide is reduced is lower than a deposition potential for depositing metallic calcium from the salt.

Other reduction processes for reducing feedstock in the form of cathodically connected tantalum oxides have been proposed, such as the polar process described in WO 03/076690.

A specific method of producing tantalum powders by electrochemical reduction is described in WO 2008/041007. This patent application describes a process for producing capacitor grade tantalum from a tantalum oxide feedstock.

Although tantalum has been successfully produced by direct electrolytic reduction of its oxide using the FFC Cambridge process, consistent and predictable control of the tantalum powder characteristics, such as morphology and particle size, has been difficult to achieve. It is an aim of the present invention to provide improved methods of producing tantalum, preferably tantalum powder having a consistent morphology and particle size.

SUMMARY OF INVENTION

The invention provides methods of producing metallic tantalum as defined in the appended independent claims to which reference should now be made. Preferred or advantageous features of the invention are defined in dependent sub-claims.

Thus, in a first aspect, the invention may provide a method of producing metallic tantalum comprising the steps of, providing a precursor material, the precursor material comprising a first-metal tantalate, in which the first-metal is an alkali metal or an alkaline earth metal, arranging the precursor material in contact with a molten salt in an electrolytic cell, the electrolysis cell further comprising an anode and a cathode arranged in contact with the molten salt, and applying a potential between the anode and the cathode such that the precursor material is reduced to metallic tantalum. The anode is not a carbon anode. Advantageously, the metallic tantalum may be formed as a powder. The metallic tantalum may be a tantalum alloy or commercially pure metallic tantalum. The metallic tantalum may be in the form of a powder suitable for manufacturing a capacitor.

The first-metal tantalate, or metal tantalate, is a compound comprising a group 1 or group 2 metal, tantalum, and oxygen. Thus, the first-metal tantalate may be s referred to as a group 1/group2 metal tantalate. Such tantalates may be naturally produced by chemical reaction when tantalum oxide is brought into contact with a molten salt comprising a group 1 or group 2 metal. Thus, when tantalum pentoxide ($Ta_2O_5$) is introduced into molten lithium chloride (LiCl), a lithium tantalate (for example $LiTaO_3$) may form. Likewise, if tantalum pentoxide is introduced into molten calcium chloride ($CaCl_2$), one or more calcium tantalate (for example $CaTa_2O_6$) may form. The production of such tantalates may be encouraged during an electrolytic reduction process such as the FFC process, and a precursor material consisting of tantalum pentoxide ($Ta_2O_5$) may be reduced to metallic tantalum via a number of different intermediate metal tantalate phases. It may be preferred that the first-metal tantalate is a calcium tantalate or a lithium tantalate.

It has been previously noted that when tantalum pentoxide is introduced into molten calcium chloride, without an electric potential being applied, the following reactions may occur in sequence.

$$Ta_2O_5 \rightarrow CaTa_4O_{11} \rightarrow CaTa_2O_6 \rightarrow Ca_2Ta_2O_7$$

During an FFC electrodecomposition reaction carried out in molten calcium chloride a potential is applied to the tantalum pentoxide (which forms part of a cathode of an FFC electrolytic cell) and the reaction pathway has been observed to proceed as follows.

$$Ta_2O_5 \rightarrow CaTa_4O_{11} \rightarrow CaTa_2O_6 \rightarrow Ca_2Ta_2O_7 \rightarrow Ca_3(CaTa_2)O_9 \rightarrow Ta$$

Thus, it can be seen that the application of the potential may lead to the formation of a further calcium tantalate, and then a reduction to tantalum metal.

The various different tantalates have different crystal structures and morphologies. For example, some are of acicular crystal structure and some have a cubic crystal structure. The growth rate of the various tantalates may also vary.

The result of this reaction pathway from tantalum pentoxide to tantalum metal when the pentoxide is reduced using the FFC process is that different metal tantalates may be formed at different places within the material structure, for different time periods, the different tantalates having different growth rates and morphologies. Thus, the tantalum powder produced by the reduction of tantalum pentoxide to metallic tantalum may have grain size distributions that are not consistent or predictable. For many applications of tantalum, particularly for capacitor applications, it is important to be able to control or predict the metallic tantalum powder grain size and morphology produced by the reduction process. Thus, it may be considerably advantageous to produce metallic tantalum by reducing a precursor material that comprises a metal tantalate, for example a lithium tantalate or a calcium tantalate in order to reduce the number of intermediate structural changes in the reaction pathway between the precursor material and the desired tantalum product.

The inventors have discovered a problem that may occur when electrolytically reducing a metal tantalate in a molten salt, for example using an FFC type reaction. The metal tantalate feedstock comprises tantalum, a group 1 or group 2 metal (that is an alkali metal or alkaline earth metal, which is preferably calcium or lithium) and oxygen. On reduction of the metal tantalate, both the group 1/group 2 metal and oxygen are liberated into the molten salt. Electrolysis cells typically comprise carbon material, for example carbon anodes. It is believed that the group 1/group 2 metal (or group 1/group 2 metal oxide) liberated from the precursor material may be able to react with carbon dioxide evolved at a carbon anode resulting in the formation of a group 1/group 2 metal carbonate in the molten salt.

$$O^{2-} + CO_2 \rightarrow CO_3^{2-}$$

This carbonate may then be able to be electrolytically decomposed and plate carbon electrochemically at the cathode of the cell.

$$CO_3^{2-} + 4e^- \rightarrow C + 3O^{2-}$$

Thus, although the particle size of the tantalum powder produced by the reduction is more controllable using a feedstock comprising a metal tantalate, a new problem, that of carbon contamination, may be introduced. Not only can carbon contaminate the metallic product produced at the cathode, carbon contamination also lowers current efficiency.

In order to optimise the quality of the metallic tantalum produced, the anode is a non-carbon anode. That is, the anode is not formed from a carbon material such as graphite. Preferably, the molten salt is not in contact with any carbon material during reduction of the precursor material. That is, it may be advantageous if none of the anode, cathode, crucible, or any other component of the electrolysis apparatus that is arranged in contact with the molten salt, is made from carbon material such as graphite.

Advantageously the precursor material may be arranged in contact with the cathode and oxygen may be released from the precursor material when the potential is applied between the anode and the cathode. Thus, the reduction may advantageously proceed by an FFC-type electrodecomposition reaction.

It may be particularly advantageous that the anode comprises a molten metal. Preferably this molten metal is a second metal that has a melting point that is sufficiently low enough for the second metal to be in the molten state during reduction of the precursor material. Preferably, at least a proportion of the oxygen released from the precursor material when the potential is applied between the anode and the cathode reacts with the molten second metal at the anode. Thus, the oxygen may react with, and become incorporated into, the molten metal at the anode. Thus, the molten metal at the anode may be consumed during the reduction of the tantalate.

Oxides formed at the anode during electrolysis may be in the form of particles which may sink into the molten metal exposing more molten metal for oxidation. The oxide formed at the anode may form particles that disperse into the molten salt and expose more molten metal for subsequent oxidation. The oxide formed at the anode may form as a liquid phase dissolved within the metal. The oxide can form rapidly at the surface of the molten anode, and can disperse away from the surface of the molten anode. Thus, formation of the oxide does not provide a significant kinetic inhibition on the oxidation reaction.

It is preferred that the second metal at the anode is at a temperature close to, and just above, its melting point during operation of the apparatus in order to reduce losses of the anode material by excessive vaporisation.

During operation of apparatus, a proportion of the second metal from the anode is likely to deposit at the cathode, where it may deposit on or interact with the reduced feedstock. In other words, the second metal may deposit on or interact with the metallic tantalum formed by reduction of the metal tantalate. Thus, the reduced feedstock may comprise both tantalum, and additionally a proportion of the second metal.

It may be desirable that the method comprises a further step of separating the second metal from the metallic tantalum to provide a tantalum product that contains less than 20 ppm of the second metal, for example a substantially pure tantalum product. Such separations may conveniently be carried out by thermal processes such as thermal distillation. For example, the boiling point of tantalum is over 5,000 degrees centigrade and will be considerably higher than the boiling point of any second metal used as the molten anode. Thus, the reduced product comprising the second metal may be heated in order to evaporate the second metal from the tantalum. The evaporated second metal may be condensed to recover the second metal and replenish the anode material.

The second metal may be removed from the tantalum by a process such as treatment in an acid wash.

If the second metal is to be separated from the tantalum, it is desirable that the second metal is a metal that does not form a highly stable alloy or intermetallic with tantalum. If tantalum and the second metal do form an alloy or intermetallic, it is preferred that the alloy or intermetallic is not stable above the boiling point of the second metal, allowing the second metal to be removed by thermal treatment. Such information may be readily obtained by the skilled person on consulting phase diagrams. For example, if the molten anode comprises molten zinc, then the reduced feedstock will comprise tantalum with a proportion of zinc. Zinc has a boiling point of 905° C. and may be removed from the tantalum by heating above 905° C. and vaporising the zinc. By using an apparatus in which the second metal is a metal that can be easily removed, such as zinc, the contamination of the reduced product at the cathode may be described as transient contamination.

The second metal, i.e. the molten anode metal, may be a commercially pure metal. Alternatively, the second metal may be an alloy of two or more elements, for example an alloy of eutectic composition. It may be desirable to have an alloy of eutectic composition in order to lower the melting point of the anode metal and thereby operate the process at a more favourable lower temperature.

Preferably, the second metal has a melting point of less than 1000° C., such that it is molten at temperatures under which the electrolysis process is likely to be performed, and a boiling point of less than 1750° C. to enable the second metal to be removed from tantalum by thermal treatment. It may be preferred if the melting point is less than 600° C. and the boiling point is less than 1000° C.

The second metal may preferably be a metal or alloy of any metal selected from the list consisting of zinc, tellurium, bismuth, tin, lead, and magnesium.

It is particularly preferred that the second metal is zinc or a zinc alloy. Zinc is a relatively low cost material and is relatively harmless in comparison to many other metals.

As an alternative to the use of a molten metal anode, the anode may be a solid inert anode, or a solid non-carbon anode, for example a solid oxygen-evolving anode, so as to eliminate carbon material from contact and interaction with the molten salt.

Whether using a molten metal anode or some other non-carbon anode, the lack of carbon material in contact with the molten salt allows a tantalum product to form that has significantly low levels of carbon. In some applications, such as capacitor applications, the fact that the product has low carbon levels may be important. Thus, the metallic tantalum may have carbon levels lower than 250 ppm, for example lower than 150 ppm, or 100 ppm, or 50 ppm, or lower than 25 ppm.

A convenient salt for use in an electrolytic reduction process such as the FFC process is calcium chloride, and it may be advantageous that the precursor material is formed comprising a calcium tantalate.

A further convenient salt for use in an electrolytic reduction process such as the FFC process is lithium chloride, and it may be advantageous that the precursor material is formed comprising a lithium tantalate.

Fresh salts may contain residual carbonates and these carbonates may deposit carbon on the cathode, thereby increasing the carbon content of the product. Thus, it may be advantageous to pre-electrolyse the salt to remove residual carbonates prior to reduction of tantalate. Once used, salt is preferably re-used for multiple reductions. The use of a pre-electrolysed salt or a used salt may result in the salt having lower carbonate content and may help to produce tantalum with very low carbon content.

While there may be some benefit in terms of controlling the grain size of the product by reducing a precursor comprising any intermediate tantalate, preferably the precursor material comprises the most thermodynamically stable tantalate formable between tantalum oxide and the first-metal. For example, in the case of calcium tantalates, the most thermodynamically stable tantalate formable between tantalum oxide and the first-metal, i.e. calcium, is the $O_9$ tantalate which has the chemical formula $Ca_3(CaTa_2)O_9$ or $Ca_4Ta_2O_9$. By starting with the most thermodynamically stable tantalate, intermediate structural changes between the precursor material and the desired tantalum product are avoided.

It may be advantageous to form the precursor material entirely from a metal tantalate. In the example where the metal tantalate is the most thermodynamically stable tantalate, for example $Ca_3(CaTa_2)O_9$, it is likely that there is a structural relationship between this final tantalate and the tantalum product. Thus, by controlling the size of the final tantalate particle size, the size of the tantalum product may be accurately controlled. Alternatively the tantalate s may be another tantalate such as the $O_7$ tantalate, $Ca_2Ta_2O_7$, which reduces to metallic tantalum via the $O_9$ tantalate.

As a further benefit of starting with an intermediate tantalate as the precursor material, in particular the final tantalate as the precursor material, the reduction time for the production of tantalum powder may be significantly reduced. Reducing the time it takes to reduce the precursor material in an electrolytic cell may have significant beneficial cost implications.

It may be advantageous in some circumstances for the precursor material to be formed from a mixture of the metal tantalate and tantalum oxide. Such a mixture can be made by mixing powdered metal tantalate and powdered tantalum oxide, and pressing the mixed powder to form a precursor material. In such an example the tantalum oxide may act as a moderator to the reduction of the metal tantalate. During reduction of such a precursor material calcium oxide released by the reduction of the tantalate may react with the tantalum oxide to convert the tantalum oxide component of the precursor into tantalate. This tantalate may then be electrolytically reduced to tantalum. If the metal tantalate and tantalum oxide are appropriately distributed throughout the precursor material, then the particles of tantalum oxide may be effectively isolated from each other, thereby minimising runaway and/or uncontrolled crystal growth and reducing the ability of the intermediate tantalates formed to grow beyond a desired size. Thus, the size of the tantalum particles formed by the reduction may be controlled even though a proportion of the precursor material is a tantalum oxide.

The presence of tantalum oxides in conjunction with metal tantalate may moderate the release of oxygen and calcium from the precursor material which may have processing benefits. This moderation occurs by the tantalum oxide mopping up calcium and oxygen released by reduction of the tantalate. Ultimately, all of the oxygen and calcium will be liberated from the precursor material, but the rate at which this occurs can be controlled by the ratio of tantalate to tantalum oxide.

It may be advantageous for the precursor material to comprise a mixture of metal tantalate and metallic tantalum. In this case the metallic tantalum may act to s improved electric conduction and charge distribution throughout the precursor material to improve the consistency of the reduction reaction. The metallic tantalum may also isolate particles or agglomerates of the metal tantalate and prevent significant tantalate growth during the reduction process (as described above in relation to a precursor material comprising tantalum oxide and metal tantalate).

It may be advantageous in certain situations to provide a precursor material comprising a mixture of metal tantalate, tantalum oxide, and metallic tantalum. Such a precursor material may combine various advantages as described above. For example, the grain size and morphology of the tantalum produced may be controlled to a certain extent by use of a metal tantalate in the precursor material. The current distribution through the precursor material may be improved by the presence of tantalum metal within the precursor material. The rate of reaction may be moderated by the presence of tantalum oxides within the precursor material. The distribution of metal tantalate and metal around the tantalum oxide particles may prevent undesired tantalate growth during reduction of the tantalum oxide.

While it may be possible for the metal in the tantalate to be different from the metallic species in the molten salt, it is preferable that the salt comprises a salt of the metal forming the tantalate or one of the metals forming the tantalate. A preferable salt would be a halide salt of the metal and preferably a chloride salt of the metal. Such salts are readily available and have good properties for electrolysis. Calcium chloride in particular is an advantageous salt to use for electrolytic reductions such as electrolytic reductions before and according to the FFC process. Such calcium chloride salts may contain other elements and species, for example calcium chloride salts used in the FFC process often contain a small proportion of calcium oxide.

Advantageously the precursor material may be in the form of powder, agglomerates of powder particles, or granules, or alternatively in the form of porous pellet or a shaped preform. If the precursor material is produced to be in the form of a porous pellet or shaped preform this process can be achieved by standard powder processing methods, for example by pressing and sintering s powders or by extrusion of powder slurries.

Although the precursor material may be reduced by any known method involving the use of molten salt and an electrolytic cell, it is preferable that an anode and a cathode are arranged in contact with the molten salt in the electrolytic cell, and the precursor material is arranged to be in contact with the cathode. A potential may then be applied between the anode and the cathode sufficient to reduce the precursor material to tantalum.

The method may comprise a further step of forming the metal tantalate element of the precursor material. Such metal tantalate powders can be made by a number of well known processes. The metal tantalate thus formed may then be further processed to form, or be incorporated into, the precursor material.

For example, the metal tantalate may be formed by a solid state thermal reaction conducted by firing mixtures of powders of oxides, carbonates, hydroxides, nitrates or the like.

If the metal tantalate is a calcium tantalate it may be formed by a thermal reaction between tantalum pentoxide, and calcium carbonate ($CaCO_3$) or between tantalum pentoxide and lithium carbonate ($Li_2CO_3$).

Another manufacturing method could involve the thermal decomposition/oxidation of a mix of organo-metallic salts such as tantalum and calcium acetates.

Alternatively, the metal tantalate may be formed by any appropriate solvent based chemical synthesis technique for example a chemical co-precipitation or a sol-gel reaction followed by a thermal and/or calcination step. Ideally the chemical process would be an aqueous process but it could entail the use of an organic solvent/medium.

Precursors suitable for an aqueous based manufacturing process may include tantalum compounds, such as acetate, nitrate or chloride. Precursors suitable for s an organic solvent/medium may include organo-tantalum compounds such as ethoxide, acetylacetonate etc.

Generally the solvent based chemical synthesis techniques will produce tantalates with a finer and more controllable crystallite size than will the thermal solid state reaction between two pre-existing precursor oxides.

Where the precursor material comprises tantalum oxide it is preferred that the tantalum oxide has a predetermined average particle size or is processed to produce a predetermined average particle size prior to forming the metal tantalate. Such processing may include growing the particles until they reach a predetermined size or sieving the powder to produce a sieved powder having a desired particle size and particle size distribution, or milling the oxide to produce a powder with desired characteristics.

The precursor material may also be processed prior to arrangement in the electrolytic cell to provide a precursor having a predetermined average particle size or predetermined precursor particle size distribution. Such processing may include steps such as sintering the precursor material. Alternatively, the components of the precursor material may be sieved or milled or ground as appropriate, to provide the desired particle size and distribution within the precursor material. Where a precursor material comprises two or more components, for example a metal tantalate and a tantalum oxide, then the relative distribution of these components within the precursor material may be controlled by suitable mixing.

Where the precursor material has more than one component, each component may have substantially the same particle size, or there may be a multimodal (e.g. bimodal or trimodal) distribution of particles, for example metal tantalate particles may be of a larger size than the other constituents of the precursor material.

Preferably the precursor material has an average particle size of between 0.1 and 100 microns. Such a size range provides a tantalum product of acceptable size range for many applications. The average particle size may be between 0.5 and 10 microns, for example between 1 micron and 8 microns, or substantially 5 or 6 microns.

In a second aspect, the invention may provide a method of producing tantalum comprising the steps of providing a precursor material, the precursor material comprising a mixture of tantalum oxide and the metallic tantalum, contacting the precursor material with a molten salt in an electrical cell and reducing the precursor material to tantalum.

This method may produce a tantalum product of predictable and controllable particle size by allowing each tantalum oxide particle within the precursor material to be bounded by metallic tantalum particles. Thus, the scope for growth of the tantalum oxide particle during reduction and the consequent transformation via a sequence of tantalates is reduced. Furthermore, the metallic tantalum may assist the conductivity and current distribution through the precursor material and allow the reduction process to proceed more uniformly and swiftly. For example, when performing an FFC electrodecomposition on a metal oxide the reaction is thought to initiate at triple points between metal, metal oxide and molten salt. By mixing metallic tantalum with the oxide, the number of triple points may be increased at an initial stage in the decomposition reaction. A swift reduction results in the materials spending less time in the reduction cell at high temperature, and thus there may be lower growth of particles during reduction.

In a third aspect, the invention may provide a method of producing tantalum comprising the steps of providing a precursor material, the precursor material comprising a mixture of tantalum oxide and a metal tantalate, in which the metal is an alkaline metal or an alkaline earth, contacting the precursor material with a molten salt in an electrolytic cell, and reducing the precursor material to tantalum.

Preferably, the precursor material comprises between 20 and 95 wt/% of tantalum oxide, particularly preferably between 40 and 90 wt/% tantalum oxide.

In a fourth aspect, the invention may provide a method of producing tantalum comprising the steps of providing a precursor material, the precursor material comprising a mixture of a metal tantalate and metallic tantalum, contacting the precursor material with a molten salt in an electrical cell and reducing the precursor material to tantalum.

The methods of the second, third or fourth aspects may be carried out with a precursor material that comprises a mixture of tantalum oxide, tantalum metal, and a metal tantalate, in which the metal is an alkaline metal or an alkaline earth. Preferable features described above in relation to the first aspect of the invention may be applied mutatis mutandis to the second, third, and fourth aspects of the invention. Thus, for example, the methods of the second, third, or fourth aspects may be carried out using a molten metal anode, or an inert anode.

The tantalum produced by the various aspects of the present invention may be a powder and may have a particular suitability for formation into capacitors. Thus, the invention may further provide a method according to any aspect as above, comprising the further step of forming the tantalum product into a capacitor.

A method of forming a capacitor may comprise the steps of forming a metallic tantalum powder using any method described above, pressing the tantalum powder to a density of between 5 and 6 g/cm$^3$ and coupling the pressed powder to an anode lead, thereby forming a tantalum anode. A dielectric layer is then formed on the tantalum anode to form a capacitor.

An electrochemical junction may form at the connection between the anode lead and the pressed powder due to compositional variations. This may not be desirable. Thus, the method of forming a capacitor may comprise the steps of forming a metallic tantalum powder using any method described above, taking a first portion of the tantalum powder and forming a tantalum wire suitable for use as an anode lead, taking a second portion of the tantalum powder and pressing the second portion of the tantalum powder to a density of between 5 and 6 g/cm$^3$, and coupling the pressed powder formed from the second portion of tantalum powder to the anode lead formed from the first portion of tantalum powder, thereby forming a tantalum anode in which the anode lead and anode body are formed from tantalum having the same composition. A dielectric layer is then formed on the tantalum anode to form a capacitor.

A capacitor formed using any method described herein may also be provided. For example, a capacitor may be provided in which the anode body and the anode lead are formed from tantalum of the same composition.

A capacitor formed from a metallic powder as described herein may have a capacitance of between 9-13.5 kCV/g for a powder with a specific surface area of about 0.3 m2/g and a capacitance of between 310-565 kCV/g for a powder with a specific surface area of about 10 m2/g.

Specific examples and embodiments of the invention will now be described with reference to the figures in which.

Figure 1:
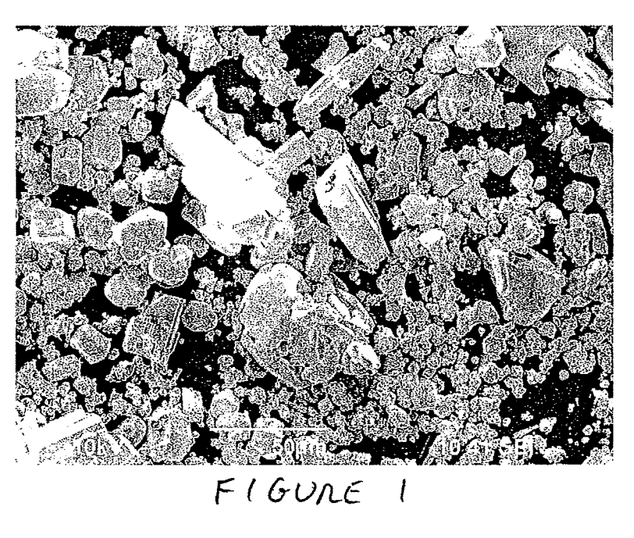
FIGS. 1 and 2 are SEM images of a partially reduced tantalum pentoxide powder, illustrating intermediate calcium tantalates of diverse size and shape.

FIG. 1 is an SEM image illustrating a tantalum pentoxide powder that has been partially reduced in a calcium chloride salt using the FFC process. The initial pentoxide powder had been sieved through a 25 micrometers mesh prior to reduction. The partially reduced powder as illustrated in FIG. 1 consists of varying particles of calcium tantalate phases. As can be seen, these tantalates vary considerably in size and morphology. As some of the tantalate phases have different growth rates to the others the resulting partially reduced material has a non-homogeneous structure containing some very large particles. If the reduction was allowed to proceed to its ultimate conclusion, i.e. the production of tantalum metal, then the Ta powder formed will also have a non-homogeneous structure.

The inventors realised that, as the reaction pathway between tantalum pentoxide and tantalum metal during electrolysis in a molten salt is not easily controllable, there may be significant benefits to be had from producing a precursor material for reduction directly from, or comprising, one of the intermediate tantalates. The particle size and particle morphology of the intermediate tantalate could then be controlled in order to improve the control over the properties of the reduced tantalum.

Preferably, the intermediate tantalate will be the final tantalate in the reaction pathway, which in the case of reduction of tantalum pentoxide to tantalum metal appears to be the $O_9$ tantalate.

Figure 3:
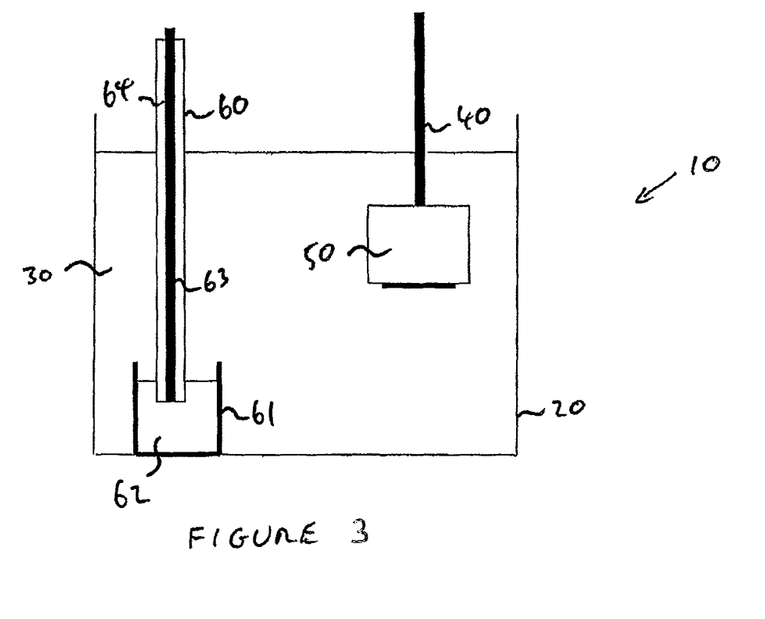
FIG. 3 is a schematic diagram of an electrolytic cell suitable for performing a reduction of a metal tantalate by the FFC process using a consumable molten metal anode.

FIG. 3 illustrates an electrolysis apparatus 10 for producing metallic tantalum by electrolytic reduction of a precursor material or feedstock. The apparatus 10 comprises a crucible 20 containing a molten salt 30. A cathode 40 comprising a pellet formed from the precursor material 50 is arranged in the molten salt 30. An anode 60 is also arranged in the molten salt. The anode comprises a crucible 61 containing a molten metal 62, and an anode connecting rod 63 arranged in contact with the molten salt 62 at one end and coupled to a power supply at the other. The anode connecting rod 63 is sheathed with an insulating sheath 64 so that the connecting rod 63 does not contact the molten salt 30.

The crucible 20 may be made from any suitable insulating refractory material. It is an aim of the invention to avoid contamination with carbon, therefore the crucible is not made from a carbon material. Neither is any component of the apparatus that may contact the molten salt formed from a carbon material. A suitable crucible material may be alumina. The precursor material 50 is a metal tantalate, the metal being a group 1 metal or a group 2 metal. The crucible 61 containing the molten metal 62 may be any suitable material, but again alumina may be a preferred material. The anode lead rod 63 may be shielded by any suitable insulating material 64, and alumina may be a suitable refractory material for this purpose.

The molten metal 62 is any suitable metal that is liquid in the molten salt at the temperature of operation. To be a suitable molten metal, the molten metal 62 must be capable of reacting with oxygen ions removed from the metal oxide to create an oxide of the molten metal species. A particularly preferable molten metal may be zinc. A further preferred molten metal may be aluminium. The molten salt 30 may be any suitable molten salt used for electrolytic reduction. For example, the salt may be a chloride salt, for example, a calcium chloride salt comprising a portion of calcium oxide. Preferred embodiments of the invention may use a lithium based salt such as lithium chloride or lithium chloride comprising a proportion of lithium oxide. The anode 60 and cathode 40 are connected to a power supply to enable a potential to be applied between the cathode 40 and its associated precursor material 50 on the one hand and the anode 60 and its associated molten metal 62 on the other.

Although the illustration of apparatus shown in FIG. 3 shows an arrangement where a feedstock pellet is attached to a cathode, it is clear that other configurations are within the scope of the invention, for example, a metal tantalate feedstock may be in the form of grains or powder and may be simply retained on the surface of a cathodic plate in an electrolysis cell.

The method of will now be described in general terms with reference to FIG. 3. A potential is applied between the anode and the cathode such that oxygen is removed from the precursor material 50. This oxygen is transported from the precursor material 50 towards the anode where it reacts with the molten metal 62 forming an oxide of the molten metal 62 and oxygen. The oxygen is therefore removed from the oxide 50 and retained within a second oxide of the molten metal.

The parameters for operating such an electrolysis cell such that oxygen is removed from an oxygen-bearing non-metallic feedstock are known through such processes as the FFC process. Preferably the potential is such that oxygen is removed from the precursor material 50 and transported to the molten metal 62 of the anode without any substantial breakdown of the molten salt 30. As a result of the process the precursor material 50 is converted to metal and the molten metal 62 is converted, as least in part, to a metal oxide. The metallic tantalum product of the reduction can then be removed from the electrolysis cell.

The inventors have carried out specific experiments based on this general method, and these are described below. The metal product produced in the examples was analysed using a number of techniques. The following techniques were used.

Carbon analysis was performed using an Eltra CS800 analyser.

Oxygen analysis was performed using an Eltra ON900 analyser.

Surface area was measured using a Micromeritics Tristar surface area analyser.

One precursor material used for reduction in a calcium chloride salt was $Ca_3(CaTa_2)O_9$. This tantalate was produced by calcination according to the following method.

The starting materials for the calcination were $Ta_2O_5$ with a primary crystallite size of about 0.3 micron and $CaCO_3$ powder. $D_{50}$ for the Ta oxide powder is 9 microns, due to aggregation of the particles. The Ta powder was then sieved at 25 micrometers. The $CaCO_3$ powder was sieved at 106 micrometers.

These materials were mixed in a proportion of $Ta_2O_5$ to $CaCO_3$=1.1244 and mixed in a turbular mixer for one hour. This proportion of tantalum pentoxide to calcium carbonate is slightly lower than the molar proportion required to form the $O_9$ tantalate to prevent excess calcium oxide remaining in the tantalate powder. Calcination was performed at a temperature of 1200° C. for two hours, resulting in the formation of the $Ca_3(CaTa_2)O_9$ tantalate powder.

A further precursor material used for reduction in a calcium chloride salt was $Ca_2Ta_2O_7$. To make $Ca_2Ta_2O_7$, tantalum pentoxide and calcium carbonate were mixed in a proportion of $Ta_2O_5$ to $CaCO_3$=2.2075 and mixed in a turbular mixer for one hour. Calcination was performed at a temperature of 1200° C. for two hours, resulting in the formation of the $Ca_2Ta_2O_7$ tantalate powder.

The tantalate powder was formed into pellets for reduction. The tantalate powder was then passed through a 106 micron sieve and pellets were pressed from the powder at a pressure of 20 bar (approximately $2\times10^6$ Pascal). After pressing the pellets were sintered at a temperature of 1100° C. for six hours.

Figure 2:
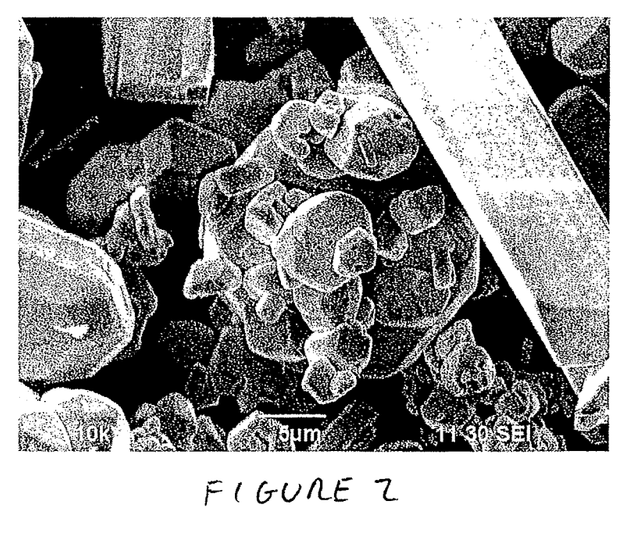
Figure 4:
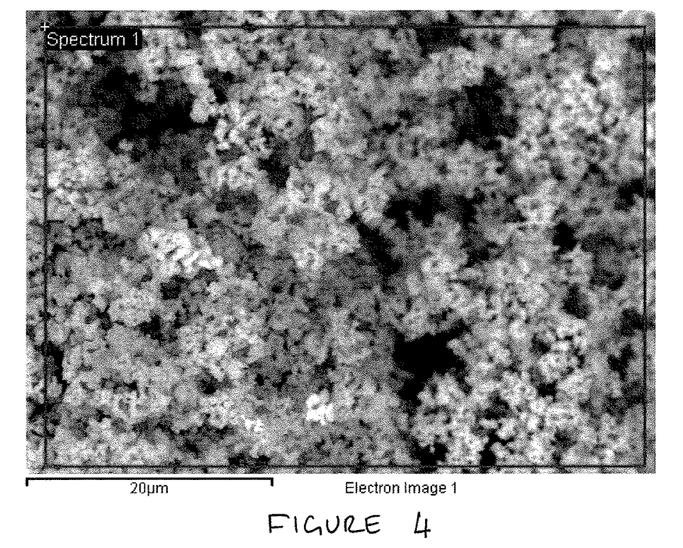
FIG. 4 is an SEM image of $Ca_3(CaTa_2)O_9$ powder.
Figure 5:
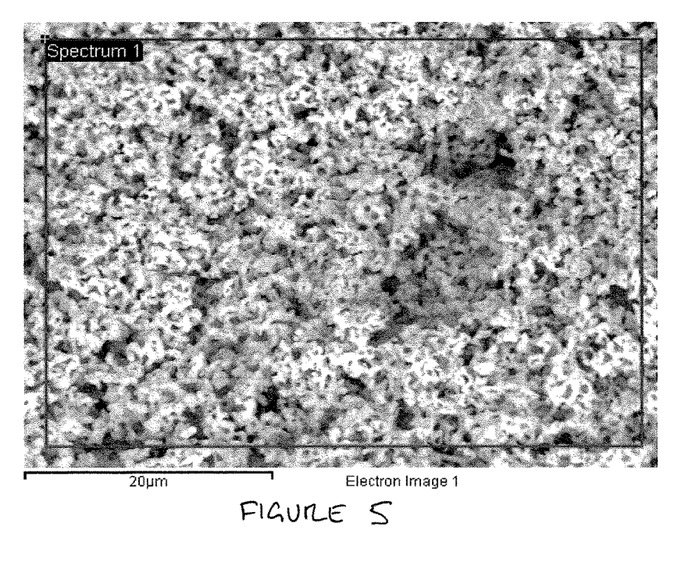
FIG. 5 is an SEM image of $Ca_2Ta_2O_7$ powder.

FIG. 4 illustrates the microstructure of the sintered $Ca_3(CaTa_2)O_9$ pellet. FIG. 5 illustrates the microstructure of the sintered $Ca_2Ta_2O_7$ pellet. The uniformity of structure and fine scale particle size can be clearly seen in comparison with those formed during the reduction of tantalum pentoxide to tantalum (illustrated in FIGS. 1 and 2).

The porosity of the pellet formed and the particle size of the tantalate within the pellet may be controlled by varying the sintering temperature and/or time in order to have some control over the pellet properties prior to reduction.

EXAMPLES

Each of the examples was produced using the following conditions.

With reference to FIG. 3, tantalate pellets 35 were mounted onto a cathode 30 of an FFC cell 5 and reduced at a temperature of 650° C. using the FFC process. The salt 20 used in the electrolytic cell 5 was primarily lithium chloride containing 0.1-1.0 wt % lithium oxide. The anode 40 of the cell comprised either molten zinc or, for comparison reductions, carbon.

Example 1

A 38 g pellet of $Ca_3(CaTa_2)O_9$ was reduced to metal using a carbon anode. 277330 Coulombs were passed at a current of 3.5 Amps. The tantalum produced was recovered, analysed and found to have a surface area of 5.1 $m^2/g$, an oxygen content of 17000 ppm, and a carbon content of 5719 ppm.

Example 2

A 20 g pellet of $Ca_3(CaTa_2)O_9$ was reduced to metal using a molten zinc anode. 42458 Coulombs were passed at a current of 2 Amps. The tantalum produced was recovered, analysed and found to have a surface area of 5.6 m$^2$/g, an oxygen content of 21000 ppm, and a carbon content of 493 ppm. The carbon content can be seen to be considerably lower than the comparative example produced using a carbon anode (Example 1).

Example 3

A 38 g pellet of $Ca_2Ta_2O_7$ was reduced to metal using a carbon anode. 270389 Coulombs were passed at a current of 3.5 Amps. The tantalum produced was recovered, analysed and found to have a surface area of 11.04 m$^2$/g, an oxygen content of 34000 ppm, and a carbon content of 1817 ppm.

Example 4

A 38 g pellet of $Ca_2Ta_2O_7$ was reduced to metal using a molten zinc anode. 271492 Coulombs were passed at a current of 3.5 Amps. The tantalum produced was recovered, analysed and found to have a surface area of 6.74 m$^2$/g, an oxygen content of 13000 ppm and a carbon content of 651 ppm. The carbon content can be seen to be considerably lower than the comparative example produced using a carbon anode (Example 3).

Example 5

A 20 g pellet of $Ca_2Ta_2O_7$ was reduced to metal using a molten zinc anode in a molten salt that had undergone a pre-electrolysis routine at a temperature of 650° C. 46218 Coulombs were passed at a current of 2 Amps. The tantalum produced had a surface area of 5.01 m$^2$/g, an oxygen content of 14000 ppm and a carbon content of 386 ppm. Although this example is almost identical to example 4, the carbon content is even lower. This may be attributed to the pre-electrolysis of the salt removing residual carbonates from the salt, thereby further lowering carbon contamination. To produce tantalum with very low carbon levels it may be advantageous to electrolyse the salt to remove carbon compounds prior to introducing the tantalate.

The reductions described above allow tantalum powder to be formed having a BET surface area that is predictable and controllable. For example, to lower the BET surface area of tantalum powder the tantalate particle size in the precursor material could be increased by, for example, sintering the powder for a longer period of time or calcining the powder for an extended period of time to grow the tantalate particles. Likewise, a tantalum powder with an increased BET surface area could be produced by lowering the particle size of the starting tantalate.

Calcium and oxygen are released from the precursor material during the electrolytic reduction and the tantalum powder formed appeared to have a finer grain size and increased surface area compared with the starting tantalate.

There were no gases evolved at the anode during electrolysis. This was due to the formation of zinc oxide in the molten zinc anode 62.

A capacitor may be formed from any tantalum powder described above using the following exemplary method. A first portion of the tantalum powder may be selected and made into a tantalum wire using a drawing process. A second portion of the tantalum powder may be pressed to a density of 5.5 g/cm$^3$ onto the wire to form a tantalum anode. The tantalum anode may then be heat treated at a temperature of between 1000 and 1600° C. for 10 minutes under vacuum. A dielectric layer (of $Ta_2O_5$ with a portion of $Al_2O_3$) may then be formed on the anode by electrolysis using a current of 150 mA/g in a phosphoric acid solution at 85° C. between 10 and 100V, thereby forming the capacitor.

We claim:

1. A method of producing metallic tantalum comprising the steps of,
    providing a precursor material, the precursor material comprising a tantalate of a first metal, in which the first metal is an alkali metal or an alkaline earth metal,
    arranging the precursor material in contact with a molten salt in an electrolytic cell, the electrolytic cell further comprising an anode and a cathode arranged in contact with the molten salt, and
    applying a potential between the anode and the cathode such that the precursor material is reduced to tantalum, in which the anode does not comprise a carbon material; in which the precursor material is arranged in contact with the cathode and in which the anode comprises a molten second metal, the second metal being different to the first-metal and having a melting point that is sufficiently low enough for the second metal to be in the molten state during reduction of the precursor material, in which substantially all of the oxygen released from the precursor material when the potential is applied between the anode and the cathode reacts with the molten second metal at the anode to form an oxide between the oxygen and the second metal.

2. The method according to claim 1, in which the second metal is a commercially pure metal, or in which the second metal is an alloy.

3. The method according to claim 1, in which the second metal has a melting point of less than 1000 degrees centigrade and a boiling point of less than 1750 degrees centigrade.

4. The method according to claim 1, in which the second metal is, or is an alloy of, any metal selected from the group consisting of zinc, tellurium, bismuth, lead, magnesium, tin, and aluminium.

5. The method according to claim 1, in which a proportion of the second metal is deposited at the cathode when the potential is applied between the anode and the cathode, such that the metallic tantalum comprises a proportion of the second metal, and comprising the further step of separating the second metal from the metallic tantalum to provide a product that comprises less than 0.1 wt % of the second metal.

6. The method according to claim 1, in which the first metal is calcium and the precursor material comprises a calcium tantalate, or in which the first metal is lithium and the precursor material comprises a lithium tantalate.

7. The method according claim 1, in which the precursor material comprises the most thermodynamically stable tantalate formable between tantalum and the metal.

8. The method according to claim 1, in which the precursor material comprises a calcium tantalate having the chemical formula $Ca_3(CaTa_2)O_9$.

9. The method according to claim 1, in which the precursor material consists of the tantalate of the first metal.

10. The method according to claim 1, in which the precursor material is a mixture of the tantalate of the first metal and tantalum oxide, or a mixture of the tantalate of the first metal and metallic tantalum, or a mixture of the tantalate of the first metal, tantalum oxide and metallic tantalum.

11. The method according to claim 1, in which the salt comprises a salt of the first metal, or a halide salt of the first metal, or a chloride salt of the first metal, or $CaCl_2$.

12. The method according to claim 1, in which the precursor material is in the form of powder, agglomerates, or granules or in the form of a porous pellet or shaped preform.

13. The method according to claim 1, comprising the further step of forming the tantalate of the first metal.

14. The method according to claim 13, in which the tantalate of the first metal is formed by reaction between a tantalum oxide and the metal or a compound comprising the metal.

15. The method according to claim 14, in which the tantalum oxide has a predetermined average particle size or is processed to produce a predetermined average particle size prior to forming the metal tantalate.

16. The method according to claim 13, in which the tantalate of the first metal is a calcium tantalate and is formed by reaction between a tantalum oxide.

17. The method according to claim 13, in which the tantalate of the first metal is formed by a chemical co-precipitation or a sol-gel reaction.

18. The method according to claim 1, further comprising the step of processing the precursor material prior to arrangement in the cell to provide a predetermined precursor average particle size or predetermined precursor particle size distribution.

19. The method according to claim 1, in which the precursor material has an average particle size of between 0.1 and 100 micron.

20. The method according to claim 1, in which the precursor material has an average particle size of about 0.5 to 10 micron.

21. The method according to claim 1, in which the molten salt is not in contact with a carbon material during reduction of the precursor material.

22. The method according to claim 1, in which the metallic tantalum has a carbon content of lower than 250 ppm, or lower than 200 ppm, or lower than 150 ppm, or lower than 100 ppm.

23. The method according to claim 1, comprising the further step of forming the metallic tantalum into a capacitor.

24. A method of producing metallic tantalum comprising the steps of,
providing a precursor material, the precursor material comprising a tantalate of a first metal, in which the first metal is an alkali metal or an alkaline earth metal,
arranging the precursor material in contact with a molten salt in an electrolytic cell, the electrolytic cell further comprising an anode and a cathode arranged in contact with the molten salt,
in which the precursor material is arranged in contact with the cathode and in which the anode comprises a molten second metal, the second metal being different to the first metal and having a melting point that is sufficiently low enough for the second metal to be in the molten state during reduction of the precursor material, in which oxygen released from the precursor material when the potential is applied between the anode and the cathode reacts with the molten second metal at the anode, and
applying a potential between the anode and the cathode such that the precursor material is reduced to tantalum;
in which the anode does not comprise a carbon material;
in which a proportion of the second metal is deposited at the cathode when the potential is applied between the anode and the cathode, such that the metallic tantalum comprises a proportion of the second metal;
and comprising the further step of separating the second metal from the metallic tantalum to provide a product that comprises less than 0.1 wt % of the second metal.

25. The method according to claim 24, in which the second metal is a commercially pure metal, or in which the second metal is an alloy.

26. The method according to claim 24, in which the metallic tantalum comprises a proportion of the second metal of between 0.1 wt % and 5 wt %.

27. The method according to claim 24, in which the precursor material consists of the tantalate of the first metal.

28. The method according to claim 24, in which the precursor material is a mixture of the tantalate of the first metal and tantalum oxide, or a mixture of the tantalate of the first metal and metallic tantalum, or a mixture of the tantalate of the first metal, tantalum oxide and metallic tantalum.

29. The method according to claim 24, in which the metallic tantalum has a carbon content of lower than 250 ppm, or lower than 200 ppm, or lower than 150 ppm, or lower than 100 ppm.

30. The method according to claim 24, comprising the further step of forming the metallic tantalum into a capacitor.

31. The method according to claim 24, in which substantially all of the oxygen removed from the precursor material reacts with the molten second metal at the anode to form an oxide between the oxygen and the second metal.

* * * * *